(12) United States Patent
Shinagawa et al.

(10) Patent No.: US 7,709,578 B2
(45) Date of Patent: May 4, 2010

(54) ADHESIVE FOR POLARIZING PLATE, POLARIZING PLATE, MANUFACTURING METHOD THEREFOR, OPTICAL FILM AND IMAGE DISPLAY

(75) Inventors: Masashi Shinagawa, Ibaraki (JP); Akiko Sugino, Ibarak (JP); Yutaka Fujita, Ibarak (JP); Masayuki Satake, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 0 days.

(21) Appl. No.: 12/268,724

(22) Filed: Nov. 11, 2008

(65) Prior Publication Data
US 2009/0122401 A1 May 14, 2009

(30) Foreign Application Priority Data
Nov. 14, 2007 (JP) .............................. 2007-295834

(51) Int. Cl.
*C08F 8/00* (2006.01)
*G02B 5/30* (2006.01)

(52) U.S. Cl. .................. 525/194; 525/326.1; 526/307.5; 359/485; 359/489; 427/163.1; 428/1.31; 156/307.3

(58) Field of Classification Search .............. 526/307.5, 526/285; 359/485, 489; 427/163.1; 428/1.31; 156/307.3; 525/326.1, 194
See application file for complete search history.

(56) References Cited

U.S. PATENT DOCUMENTS

| 6,313,182 B1 * | 11/2001 | Lassila et al. ................ 516/204 |
| 2006/0033993 A1 * | 2/2006 | Sugino et al. ................ 359/487 |
| 2006/0291054 A1 * | 12/2006 | Tomoguchi ................ 359/485 |

FOREIGN PATENT DOCUMENTS

| EP | 1 988 123 A1 | 11/2008 |
| JP | 7-198945 A | 8/1995 |
| JP | 2006-178191 A | 7/2006 |
| WO | 2007/097349 A1 | 8/2007 |

OTHER PUBLICATIONS

European Search Report dated Feb. 19, 2009, issued in corresponding European Patent Applicaton No. 08019850.0.

* cited by examiner

*Primary Examiner*—Ling-Siu Choi
(74) *Attorney, Agent, or Firm*—Westerman, Hattori, Daniels & Adrian, LLP

(57) ABSTRACT

An adhesive of the present invention is used for polarizing plate to provide a transparent protective film on at least one side of a polarizer and comprises a resin solution comprising a polyvinyl alcohol-based resin, a crosslinking agent and a leveling agent containing an acetylene skeleton-containing compound, wherein 0.01 to 10 parts by weight of the leveling agent is added to 100 parts by weight of the polyvinyl alcohol-based resin. The adhesive for polarizing plate can provide a satisfactory wettability when applied to transparent protective films and allows the production of polarizing plates to have water resistance at high temperature and satisfactory optical properties.

25 Claims, 1 Drawing Sheet

[FIG.1]
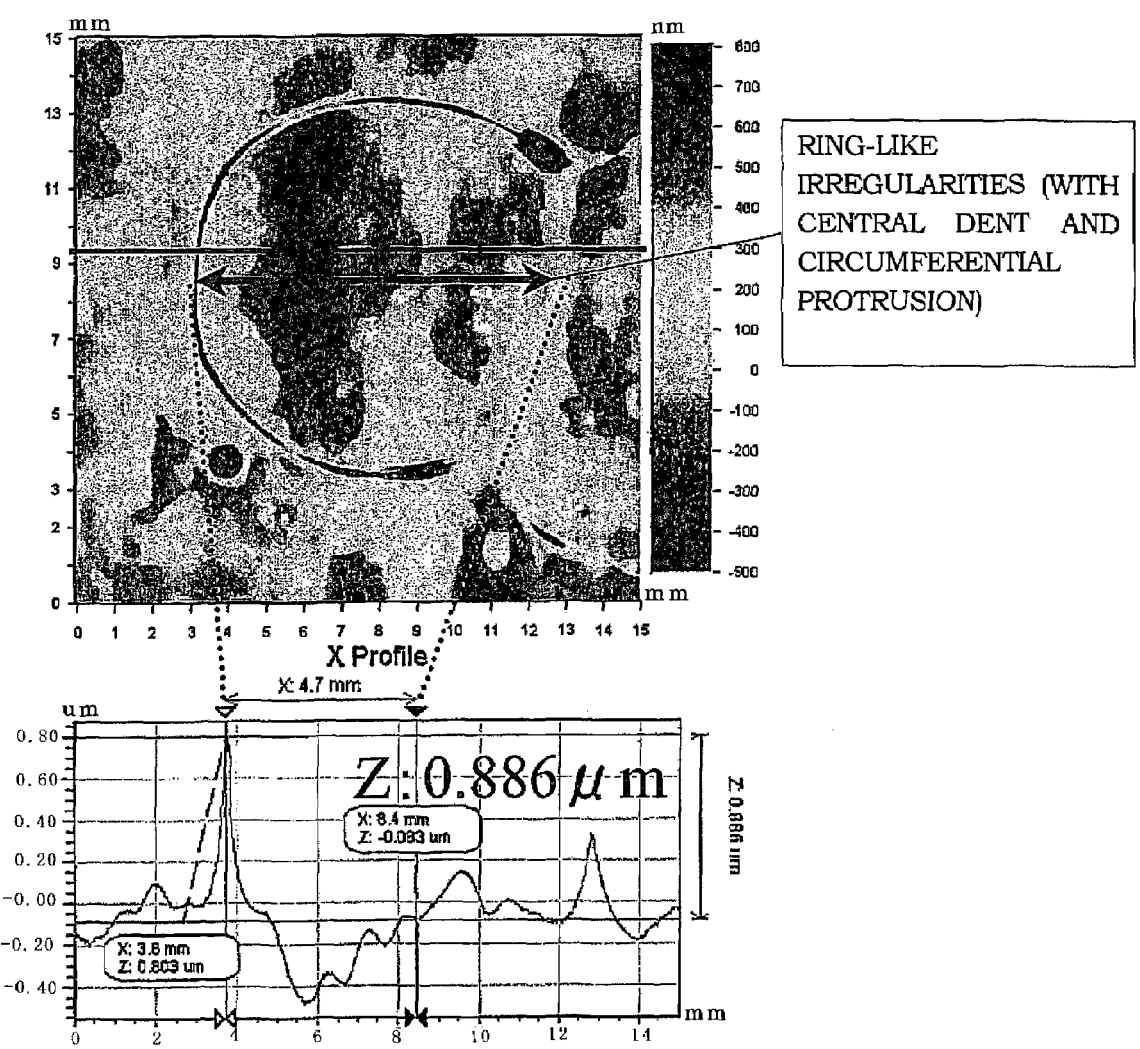

ADHESIVE FOR POLARIZING PLATE, POLARIZING PLATE, MANUFACTURING METHOD THEREFOR, OPTICAL FILM AND IMAGE DISPLAY

BACKGROUND OF THE INVENTION

1. Field of the Invention

The present invention relates to an adhesive for polarizing plate. The present invention further relates to a polarizing plate and manufacturing method thereof using the adhesive for polarizing plate. The polarizing plate alone or an optical film obtained by laminating the polarizing plate can constitute an image display such as a liquid crystal display, an organic EL display or PDP.

2. Description of the Related Art

In the liquid crystal displays, for example, it is indispensable to dispose polarizers on both sides of a glass substrate providing a surface of a liquid crystal panel according to an image formation scheme adopted in the display. A polarizer is generally obtained in a procedure in which a polyvinyl alcohol-based film is dyed with a dichroic material such as iodine, thereafter, the film is crosslinked with a crosslinking agent and then, mono-axially stretched to thereby form a film. Since the polarizer is manufactured by stretching, it is easy to shrink. Since a polyvinyl alcohol-based film comprises a hydrophilic polymer, the film is very easily deformed especially in a humidified condition. Since the film itself is weak in mechanical strength, there has been a problem that the film is torn. Hence, adopted is a reinforced polarizing plate manufactured in a procedure in which a transparent protective film or transparent protective films each made from triacetyl cellulose or the like are adhered to on one side or both sides of a polarizer. The polarizing plate is manufactured by adhere the transparent protective film onto a polarizer using an adhesive.

In recent years, the range of uses of liquid crystal displays has been increased and extended to cover from portable terminals to large screen home TVs, and their standards have been defined for each application. In particular, portable terminal applications, which must be portable for users, strongly demand durability. For example, polarizing plates are required to have water resistance to such an extent that their properties and form will not change even under humidified conditions, further humidified conditions at high temperature such as conditions causing dew condensation.

As mentioned above, a polarizer may be reinforced in strength with a transparent protective film to form a polarizing plate before use. As an adhesive for polarizing plate used in adhesion of the polarizer and the transparent protective film to each other, an aqueous type adhesive is conventionally preferable and, for example, a polyvinyl alcohol-based adhesive obtained by mixing a crosslinking agent into a polyvinyl alcohol aqueous solution has been employed. A polyvinyl alcohol-based adhesive may cause peeling at the interface between a polarizer and a transparent protective film in a humidified environment. This is considered because a polyvinyl alcohol-based resin, which is a main component of the adhesive, is a water-soluble polymer and a possibility of dissolution of an adhesive occurs in a situation of dewing. In order to cope with the problem, a proposal has been offered of an adhesive for polarizing plate containing a polyvinyl alcohol-based resin having an acetoacetyl group, and a crosslinking agent (see JP-A No.7-198945).

On the other hand, when a polarizer and a transparent protective film are laminated together with the aqueous polyvinyl alcohol-based adhesive interposed therebetween in the process of preparing a polarizing plate, it is desired to improve the wettability of the transparent protective film by the adhesive. For example, therefore, it is proposed that the transparent protective film should be subjected to activation treatment such as corona or plasma treatment (see JP-A No. 2006-178191). In some cases, however, even after the transparent protective film is subjected to activation treatment, the activation is insufficient so that sufficient wettability cannot be obtained, depending on the type of the transparent protective film. In order to improve wettability, it is also proposed that an additive such as a fluoro surfactant or any other surfactant, a specific acrylic resin, or a silicone leveling agent or any other leveling agent should be added to the adhesive. However, mixing the additive into the adhesive can undesirably reduce the adhesion (particularly water-resistant adhesion) or lead to the production of polarizing plates with degraded optical properties.

The polarizing plate may be manufactured by a method (precoating method) including the steps of applying the aqueous polyvinyl alcohol-based adhesive to a transparent protective film and then laminating a polarizer to the transparent protective film after or without drying or by another method (simultaneous coating method) including the step of laminating a transparent protective film to a polarizer, while interposing the adhesive between them by coating. Since wettability is required to be good in the precoating method, however, polarizing plates obtained by the precoating method have a problem in which they can suffer from visible unevenness.

SUMMARY OF THE INVENTION

An object of the present invention is to provide an adhesive for polarizing plate that is capable of providing a satisfactory wettability when applied to transparent protective films and allows the production of polarizing plates to have water resistance at high temperature and satisfactory optical properties.

It is another object of the present invention to provide a polarizing plate using the adhesive for polarizing plate and a manufacturing method thereof. It is yet another object of the present invention to provide an optical film laminating the polarizing plate, further another object of the present invention to provide an image display such as a liquid crystal display using the polarizing plate or the optical film.

The inventors have conducted serious studies in order to solve the above tasks with findings that the objects can be achieved with an adhesive for polarizing plate shown below, having led to completion of the present invention.

The present invention relates to an adhesive for polarizing plate used for providing a transparent protective film on at least one side of a polarizer, comprising:

a resin solution comprising a polyvinyl alcohol-based resin, a crosslinking agent and a leveling agent containing an acetylene skeleton-containing compound, wherein 0.01 to 10 parts by weight of the leveling agent is added to 100 parts by weight of the polyvinyl alcohol-based resin.

In the adhesive for polarizing plate, the leveling agent is preferably an aqueous dispersion or aqueous solution containing the acetylene skeleton-containing compound. And the aqueous dispersion preferably contains alkylene glycol.

In the adhesive for polarizing plate, the acetylene skeleton-containing compound is preferably an ethylene oxide and/or a propylene oxide adduct of acetylene glycol.

It is favorable when the polyvinyl alcohol-based resin used in the adhesive for polarizing plate is a polyvinyl alcohol-based resin having an acetoacetyl group.

In the adhesive for polarizing plate, the crosslinking agent preferably contains a methylol group-containing compound.

In the adhesive for polarizing plate, an amount of the crosslinking agent is preferably of 1 to 60 parts by weight based on 100 parts by weight of the polyvinyl alcohol-based resin.

The present invention also relates to a polarizing plate, comprising: a polarizer; and a transparent protective film provided on at least one side of the polarizer with an adhesive layer interposed therebetween, wherein the adhesive layer is formed of the adhesive for polarizing plate.

In the polarizing plate, the adhesive layer preferably has a thickness of 10 nm to 300 nm.

The present invention also relates to a method for manufacturing a polarizing plate comprising a polarizer and a transparent protective film provided on at least one side of the polarizer with an adhesive layer interposed therebetween, comprising the steps of: preparing the above-described adhesive for polarizing plate; applying the adhesive for polarizing plate to the transparent protective film to form the adhesive layer; and laminating the polarizer to the adhesive layer-carrying transparent protective film through the adhesive layer.

The present invention also relates to a method for manufacturing a polarizing plate comprising a polarizer and a transparent protective film provided on at least one side of the polarizer with an adhesive layer interposed therebetween, comprising the steps of: preparing the above-described adhesive for polarizing plate; applying the adhesive for polarizing plate to the transparent protective film and then drying the adhesive to form the adhesive layer on the transparent protective film; and laminating the polarizer to the adhesive layer-carrying transparent protective film through the adhesive layer.

The present invention also relates to an optical film, comprising a laminate including at least one piece of the above-described polarizing plate.

The present invention also relates to an image display, comprising the above-described polarizing plate or the above-described optical film.

The adhesive for polarizing plate of the present invention contains not only a polyvinyl alcohol-based resin and a crosslinking agent but also a leveling agent containing an acetylene skeleton-containing compound. The leveling agent can act to achieve satisfactory wettability, when the adhesive is applied to various transparent protective films. Therefore, with the adhesive for polarizing plate of the present invention, polarizing plates produced even by precoating methods can be prevented from suffering from unevenness. Thus, the yield of manufacturing polarizing plates can be improved so that the polarizing plate productivity can be improved. Precoating methods for manufacturing polarizing plates include a method including the steps of applying the adhesive for polarizing plate to a transparent protective film, subjecting the adhesive to a drying process to form a dried pressure-sensitive adhesive layer, and then laminating the pressure-sensitive adhesive layer to a polarizer and a method including the steps of applying the adhesive to a transparent protective film and then laminating a polarizer to the transparent protective film without performing a drying process. The adhesive for polarizing plate of the present invention can achieve satisfactory wettability in both methods and is highly effective in the former method in which wettability is particularly required.

The adhesive for polarizing plate of the present invention includes a leveling agent containing an acetylene skeleton-containing compound. The use of the specified amount of the leveling agent can ensure the wettability and allows the production of polarizing plates exhibiting a satisfactory adhesion even at high temperature and high humidity and exhibiting a high level of water-resistant adhesion at high temperature. The resulting polarizing plate can have satisfactory optical properties, just like leveling agent-free polarizing plates.

BRIEF DESCRIPTION OF THE DRAWING

FIG. 1 shows a case where unevenness in a polarizing plate obtained in an example was evaluated as "×".

DETAILED DESCRIPTION OF THE PREFERRED EMBODIMENTS

The adhesive for polarizing plate of the present invention is a resin solution including a polyvinyl alcohol-based resin, a crosslinking agent and a leveling agent containing an acetylene skeleton-containing compound.

The polyvinyl alcohol-based resin may be a polyvinyl alcohol resin or a polyvinyl alcohol-based resin having an acetoacetyl group. The polyvinyl alcohol-based resin having an acetoacetyl group can form a highly reactive functional group-containing polyvinyl alcohol-based adhesive and thus is preferred because it can increase the durability of the polarizing plate. Conventionally, when leveling agents are used in adhesive for polarizing plates including an acetoacetyl group-containing polyvinyl alcohol-based resin, reduction in water resistance or degradation in optical properties is frequently observed. In contrast, the use of the adhesive for polarizing plate of the present invention can prevent reduction in water resistance or degradation in optical properties, even when it includes an acetoacetyl group-containing polyvinyl alcohol-based resin, because it also includes a leveling agent containing the acetylene skeleton-containing compound.

Examples of polyvinyl alcohol-based resin include: a polyvinyl alcohol obtained by saponifying a polyvinyl acetate; a derivative thereof; a saponified copolymer of vinyl acetate and a monomer copolymerizable therewith; and polyvinyl alcohols modified by acetalization, urethanization, etherification, grafting, phosphate esterification and the like. Examples of the monomers include, unsaturated carboxylic acids such as maleic anhydride, fumaric acid, crotonic acid, itaconic acid and (meth) acrylic acid, and esters thereof; α-olefins such as ethylene and propylene; (meth)allylsulfonic acid or sodium salt thereof, (meth)allylsulfonate; sodium sulfonate (monoalkyl maleate), sodium disulfonate (alkyl maleate); N-methylolacrylamide; an alkai salt of acrylamide alkylsulfonate; N-vinylpyrrolidone, a derivative of N-vinylpyrrolidone and the like. The polyvinyl alcohol-based resins can be either used alone or in combination of two kinds or more.

While no specific limitation is imposed on a polyvinyl alcohol-based resin, an average degree of polymerization is from about 100 to about 5000, preferably from 1000 to 4000 and an average degree of saponification is from about 85 to about 100 mol %, preferably from 90 to 100 mol % in consideration of adherence.

A polyvinyl alcohol-based resin having an acetoacetyl group is obtained by reacting a polyvinyl alcohol-based resin and diketene to each other with a known method. Examples of known methods include: a method in which a polyvinyl alcohol-based resin is dispersed into a solvent such as acetic acid, to which diketene is added and a method in which a polyvinyl alcohol-based resin is previously dissolved into a solvent such as dimethylformamide or dioxane, to which diketene is added. Another example is a method in which diketene gas or diketene liquid is brought into direct contact with a polyvinyl alcohol.

No specific limitation is imposed on a degree of modification by an acetoacetyl group in a polyvinyl alcohol-based resin having an acetoacetyl group or groups as far as the degree of modification is 0.1 mol % or more. If the degree of modification is less than 0.1 mol %, water resistance of an adhesive layer is insufficient, which is improper. A degree of modification by an acetoacetyl group is preferably from about 0.1 to about 40 mol %, more preferably from 2 to 7 mol %. If a degree of modification by an acetoacetyl group exceeds 40 mol %, reaction sites with a crosslinking agent is fewer to thereby reduce an effect of improvement on moisture resistance and heat resistance. The degree of modification by an acetoacetyl group is a value determined by NMR.

Any of crosslinking agents that have been used in a polyvinyl alcohol-based adhesive can be used as a crosslinking agent in the present invention without a specific limitation thereon. A crosslinking agent that can be used is a compound having at least two functional groups having reactivity with a polyvinyl alcohol-based resin. Examples thereof include: alkylene diamines having an alkylene group and two amino groups such as ethylene diamine, triethylene diamine and hexamethylene diamine; isocyanates such as tolylene diisocyanate, hydrogenated tolylene diisocyanate, trimethylolpropane tolylene diisocyanate adduct, triphenylmethane triisocyanate, methylenebis(4-phenylmethane)triisocyanate and isophorone diisocyanate, and ketoxime-blocked products thereof or isocyanates of phenol-blocked products; epoxy compounds such as ethylene glycol diglycidyl ether, polyethylene glycol diglycidyl ether, glycerin di- or triglicydyl ether, 1,6-hexanediol diglycidyl ether, trimethylolpropane triglycidyl ether, diglycidyl aniline and diglycidyl amine; monoaldehydes such as formaldehyde, acetaldehyde, propionaldehyde and butylaldehyde; dialdehydes such as glyoxal, malonaldehyde, succindialdehyde, glutardialdehyde, maleic dialdehyde and phthaldialdehyde; amino-formaldehyde resins such as condensates with formaldehyde of methylolurea, methylolmelamine, alkylated methylolurea, alkylated methylolmelamine, acetoguanamine and benzoguanamine; salts of divalent metals or trivalent metals such as sodium, potassium, magnesium, calcium, aluminum, iron and nickel, and oxides of the metals. In particular, amino-formaldehyde resins and dialdehydes are preferred. Amino-formaldehyde resins preferably include methylol group-containing compounds, and dialdehydes preferably include glyoxal. Methylolmelamine, a methylol group-containing compound, is particularly preferred. The crosslinking agent to be used may be a coupling agent such as a silane coupling agent and a titanium coupling agent.

While the amount of the crosslinking agent to be blended may be appropriately determined depending on the type of the polyvinyl alcohol-based resin and the like, it is generally from about 1 to about 60 parts by weight, preferably from about 10 to about 55 parts by weight, more preferably from 20 to 50 parts by weight, based on 100 parts by weight of the polyvinyl alcohol-based resin. In such ranges, good adhesion properties can be obtained.

In order to increase durability, a polyvinyl alcohol-based resin having an acetoacetyl group is used. Also in this case, the crosslinking agent may be used in an amount of about 1 to about 60 parts by weight, preferably in an amount of about 10 to about 55 parts by weight, more preferably in an amount of 20 to 50 parts by weight, similarly to the above, based on 100 parts by weight of the polyvinyl alcohol-based resin. If the amount of the crosslinking agent to be blended is too large, the reaction of the crosslinking agent can proceed within a short time so that the adhesive can tend to form a gel, and as a result, the adhesive can have an extremely short pot life and thus can be difficult to use industrially. From these points of view, the crosslinking agent is used in the above amount, but the resin solution according to the present invention can be stably used even when the amount of the crosslinking agent is large as mentioned above, because the resin solution contains the leveling agent containing an acetylene skeleton-containing compound.

The leveling agent used in the present invention contains an acetylene skeleton-containing compound. Examples of the acetylene skeleton-containing compound include acetylenic alcohols and acetylene glycols. Acetylenic alcohols or acetylene glycols may be obtained by reactions of acetylene with ketones or aldehydes. Examples of the acetylene skeleton-containing compound also include derivatives such as ethylene oxide and/or propylene oxide adducts of acetylene alcohols, ethylene oxide and/or propylene oxide adducts of acetylene glycols, and ether-modified acetylene alcohols or glycols such as ally ether-modified acetylenic alcohols or glycols. In particular, ethylene oxide and/or propylene oxide adducts of acetylene glycols are preferred. One or more of acetylenic alcohols, acetylene glycols and derivatives thereof may be used alone or in any combination or two or more kinds thereof as the acetylenic skeleton-containing compound.

Examples of acetylene glycols and derivatives thereof include the compounds represented by the following general formula (1) below. The compounds have a symmetric structure composed of hydrophilic moiety-hydrophobic moiety-hydrophilic moiety and are suitable as wetting agents or penetrating agents and capable of reducing dynamic surface tension or dynamic contact angle. The compounds also have a high level of deforming or degassing properties and are easily dispersible in water.

Formula (1):

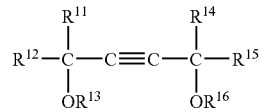

In the formula, $R^{11}$ and $R^{14}$ each represent a hydrogen atom or a methyl group, $R^{12}$ and $R^{15}$ each represent a straight or branched chain alkyl group of 1 to 8 carbon atoms, and $R^{13}$ and $R^{16}$ each represent a hydrogen atom, an allyl group or an ethylene oxide adduct moiety and/or a propylene oxide adduct moiety. The adduct moiety may be represented by the formula $—(AO)_n\text{-AOH}$, wherein n is an integer of 1 to 7, preferably of 1 to 5, more preferably of 1 to 3, and A represents an ethylene group and/or a propylene group.

In the acetylene glycols or derivatives thereof represented by formula (1), $R^{11}$ and $R^{14}$ each preferably represent a methyl group, and $R^{12}$ and $R^{15}$ each preferably represent an alkyl group of 3 to 5 carbon atoms, particularly preferably a branched chain alkyl group of 3 to 5 carbon atoms. In particular, the branched chain alkyl group is preferably an isoalkyl group. $R^{13}$ and $R^{16}$ each preferably represent an ethylene oxide adduct moiety and/or a propylene oxide adduct moiety, particularly preferably an ethylene oxide adduct moiety. Examples of the acetylene glycols represented by formula (1) (wherein $R^{13}$ and $R^{16}$ each represent a hydrogen atom) include 2,5,8,11-tetramethyl-6-dodecine-5,8-diol, 2,4,7,9-tetramethyl-5-decine-4,7-diol, 3,6-dimethyl-4-octyne-3,6-diol.

In an embodiment of the present invention, the leveling agent used is generally an aqueous dispersion or solution of the acetylene skeleton-containing compound. The concentration of the acetylene skeleton-containing compound in the aqueous dispersion or solution is generally, but not limited to, from 10 to 80% by weight, preferably from 20 to 70% by weight, more preferably from 30 to 50% by weight. Water may be used as a dispersion medium for the aqueous dispersion or solution. Besides water, alcohols such as methanol, ethanol and isopropanol, alkylene glycols such as propylene glycol, glycol monoethers, or other dispersion media may also be used. Any mixture of these dispersion media may also be used. When ethylene oxide and/or propylene oxide adducts of acetylene glycols are used as the acetylene skeleton-containing compounds, certain dispersion media other than water are preferably used so that wettability can be improved. In this case, such media other than water are preferably alkylene glycols, and propylene glycol is particularly preferred.

The leveling agent containing the acetylene skeleton-containing compound is added in an amount of 0.01 to 10 parts by weight (in terms of solid content), based on 100 parts by weight of the polyvinyl alcohol-based resin. When the content of the leveling agent containing the acetylene skeleton-containing compound is within the above range, the wettability to transparent protective films can be ensured and polarizing plates with satisfactory high-temperature water resistance and optical properties can be produced. The content of the leveling agent containing the acetylene skeleton-containing compound is preferably from 0.05 to 5 parts by weight, more preferably from 0.3 to 4 parts by weight, even more preferably from 0.4 to 1 part by weight. If the content of the leveling agent containing the acetylene skeleton-containing compound is more than 10 parts by weight, based on 100 parts by weight of the polyvinyl alcohol-based resin, polarizing plates with satisfactory high-temperature water resistance and optical properties cannot be produced. If the content of the leveling agent containing the acetylene skeleton-containing compound is less than 0.01 parts by weight, based on 100 parts by weight of the polyvinyl alcohol-based resin, wettability can be insufficient, or it can be difficult to prevent polarizing plates from suffering from unevenness in the process of preparing the polarizing plates by precoating methods.

The adhesive for polarizing plate of the present invention is a resin solution including the polyvinyl alcohol-based resin, the crosslinking agent and the leveling agent containing an acetylene skeleton-containing compound and generally used in the form of an aqueous solution. While the resin solution may have any concentration, it preferably has a concentration of 0.1 to 5% by weight, more preferably of 0.5 to 2% by weight, further more preferably of 1 to 1.5% by weight in view of coatability, shelf stability and the like. If the content is less than 0.1% by weight, sufficient adhesive strength may not be obtained. If the content is more than 5% by weight, the pot life may be reduced.

The resin solution for use as the adhesive for polarizing plate may be prepared by any method. In general, the resin solution may be prepared by a process that includes mixing the polyvinyl alcohol-based resin and the crosslinking agent, appropriately adjusting the concentration thereof, and then adding the leveling agent containing an acetylene skeleton-containing compound to the mixture. Optionally, a polyvinyl alcohol-based resin having an acetoacetyl group may be used as the polyvinyl alcohol-based resin. When the crosslinking agent is added in a relatively large amount, the stability of the solution may be taken into account, and therefore the mixing of the polyvinyl alcohol-based resin and the leveling agent containing an acetylene skeleton-containing compound may be followed by the addition of the crosslinking agent in consideration of the timing of using the resulting resin solution and so on. The concentration of the resin solution for use as the adhesive for polarizing plate may be adjusted as appropriate, after the resin solution is prepared.

The adhesive for polarizing plate may also contain various types of tackifiers, stabilizing agents such as ultraviolet absorbing agents, antioxidants, heat-resistant stabilizing agents, and hydrolysis-resistant stabilizing agents, and so on. The adhesive for polarizing plate of the present invention may also contain metal compound filler.

A polarizing plate of the present invention is manufactured by lamination to bond a transparent protective film to a polarizer with the adhesive. In the obtained polarizing plate, a transparent protective film or transparent protective films are provided on one surface or both surfaces of a polarizer with an adhesive agent layer formed with the adhesive for polarizing plate interposed therebetween.

Coating of the adhesive may be performed on one/or both of the transparent protective film and the polarizer. Coating of the adhesive is preferably conducted so as to achieve a thickness after drying of the order in the range of from 10 to 300 nm. The thickness of the adhesive layer is more preferably from 10 to 250 nm, still more preferably from 20 to 200 nm, in terms of achieving uniform in-plane thickness and sufficient adhesive force.

Examples of methods for controlling the thickness of the adhesive layer include, but are not limited to, methods including controlling the solid concentration of the adhesive solution or controlling an adhesive coater. While the thickness of the adhesive layer may be measured by any method, cross-sectional observation measurement by SEM (Scanning Electron Microscopy) or TEM (Transmission Electron Microscopy) is preferably used. The adhesive may be applied by any process, and various methods such as roll methods, spraying methods, and immersion methods may be used for the application.

The manufacturing method of the present invention is preferably applied to precoating methods. Among precoating methods for manufacturing polarizing plates, a certain method that includes applying the adhesive for polarizing plate to a transparent protective film, subjecting the adhesive to a drying process to form a dried pressure-sensitive adhesive layer, and then laminating the pressure-sensitive adhesive layer to a polarizer is preferably used so that production efficiency can be improved. When conventional precoating methods are used, unevenness is observed in the resulting polarizing plates, because adhesives have poor wettability. In contrast, with the adhesive of the present invention, polarizing plates can be prevented from suffering from unevenness, even when produced by precoating methods.

For example, a precoating method may include applying the adhesive for polarizing plate in the form of a solution to a polarizer and/or a transparent protective film, laminating the polarizer and the transparent protective film, and then subjecting the laminate to a drying process to form a dried adhesive layer so that a polarizing plate can be obtained. After the application of the adhesive, the polarizer and the transparent protective film may be laminated using a roll laminator or the like. After the lamination, the drying process may be performed at a drying temperature of about 5 to about 150° C., preferably of 30 to 120° C., for a time period of 120 seconds or more, preferably of 300 seconds or more.

For example, another precoating method may include applying the adhesive for polarizing plate to a transparent protective film, then drying the adhesive to form a dried adhesive layer on the transparent protective film, and then laminating a polarizer to the adhesive layer-carrying transparent protective film through the adhesive layer so that a polarizing plate can be obtained. The laminating may be performed with a roll laminator or the like.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film comprises dichromatic materials such as iodine, dichromatic dye is suitably used. Although thickness of polarizer is not especially limited, the thickness of about 5 to about 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

Preferable Materials that form the transparent protective film, which is provided one side or both sides of the polarizer is the material having outstanding transparency, mechanical strength, heat stability and outstanding moisture interception property, or the like. As materials of the above-mentioned transparent protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a transparent protective film, polyolefin type polymers, such as polyethylene, polypropylene, polyolefin that has cyclo- type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; arylate type polymers; polyoxymethylene type polymers; epoxy type polymers; or blend polymers of the above-mentioned polymers may be mentioned. The transparent protective film is generally laminated to the polarizer with the adhesive layer, but thermosetting resins or ultraviolet curing resins such as (meth)acrylic, urethane, acrylic urethane, epoxy, or silicone resins may be used for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 µm from the viewpoint of a strength, workability such as handlability, requirement for a thin film and the like. Especially, the thickness is preferably in the range of from 1 to 300 µm and more preferably in the range of from 5 to 200 µm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZTAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, more preferably, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth) acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth) acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (2):

[Formula 2]

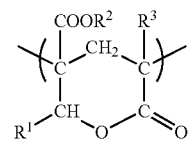

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (2) in the lactone ring structure-containing (meth) acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (2) in the lactone ring structure-containing (meth)acrylic resin is less than 5% by weight, its heat resistance, solvent resistance or surface hardness can be insufficient. If the content of the lactone ring structure represented by Formula (2) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=

(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, nz−nx>ny, nz>nx>ny, or nz>nx=ny may be selected and used depending on various applications. The relation ny−nz includes not only the case where ny is completely equal to nz but also the case where ny is substantially equal to nz.

For example, the retardation plate satisfying the relation nx>ny>nz to be used preferably has a in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has a in-plane retardation of 100 to 200 nm. For example, the retardation plate satisfying the relation nz=nx>ny (negative A plate) to be used preferably has a in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (positive A-plate, biaxial, negative C-plate) is preferred. In the case of VA, preferable is a combination of the positive A-plate and the negative C-plate or single use of the biaxial film. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, the biaxial film satisfying relationship of nx>nz>ny on the upper side with no retardation on the lower side or an positive A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A-plate, biaxial, negative C-plate) is preferred.

The film with a retardation may be separately prepared and laminated to a transparent protective film with no retardation so that the function described above can be provided.

An easy adhesion treatment can be applied onto a surface of a transparent protective film which is adhered to a polarizer. Examples of easy adhesion treatments include: dry treatments such as a plasma treatment and a corona treatment; chemical treatment such as alkaline treatment (saponification); and a coating treatment in which an easy adhesion layer is formed. Among them, preferable are a coating treatment and an alkaline treatment each forming an easy adhesion layer. In formation of an easy adhesion layer, there can be used each of various kinds of easy adhesion materials such as a polyol resin, a polycarboxylic resin and a polyester resin. Note that a thickness of an easy adhesion layer is preferably usually from about 0.001 to about 10 μm, more preferably from about 0.001 to about 5 μm and especially preferably from about 0.001 to about 1 μm.

A hard coat layer may be prepared, or antireflection processing, processing aiming at sticking prevention, diffusion or anti glare may be performed onto the face on which the polarizing film of the above described transparent protective film has not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linear polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of a polarizing film or an optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate or an optical film using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 500 μm, preferably to 200 μm, and more preferably 1 to 100 μm.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessary, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of a construction and effect of the present invention with examples and the like showing them below. Note that in the examples, part or parts and % are based on weight unless otherwise specified.

Example 1

(Polarizer)

A 75 μm-thick polyvinyl alcohol film with an average degree of polymerization of 2400 and a saponification degree of 99.9% by mole was immersed and allowed to swell in warm water at 30° C. for 60 seconds. The film was then immersed in an aqueous solution of iodine/potassium iodide (0.5/8 in weight ratio) at a concentration of 0.3%, while stretched to a stretch ratio of 3.5 times, so that the film was dyed. The film was then stretched in an aqueous borate ester solution at 65° C. such that the total stretch ratio reached 6 times. After the stretching, the film was dried in an oven at 40° C. for 3 minutes, resulting in a polarizer.

(Transparent Protective Films)

A 40 μm-thick triacetylcellulose film was used as a first transparent protective film. A 70 μm-thick biaxially-stretched norbornene film (Zeonor manufactured by Zeon Corporation) was used as a second transparent protective film.

(Preparation of Adhesive)

An aqueous solution with a solid content adjusted to 1% was prepared by dissolving 100 parts of an acetoacetyl group-containing polyvinyl alcohol-based resin (1,200 in average degree of polymerization, 98.5% by mole in degree of saponification, 5% by mole in degree of acetoacetylation), 35 parts of methylol melamine, and 0.15 parts of a leveling agent containing an acetylene skeleton-containing compound (Olfine EXP4123 (trade name) manufactured by Nissin Chemical Industry Co., Ltd., 40% in solid content, containing a mixture of water/propylene glycol=10/50 in weight ratio as a dispersion medium) in pure water at a temperature of 30° C.

(Preparation of Polarizing Plate)

The adhesive was applied to one side of each of the first and second transparent protective films so that the adhesive layer could have a thickness of 100 nm after drying. The application of the adhesive was performed 30 minutes after the preparation thereof at a temperature of 30° C. The adhesive-coated transparent protective films were then dried at 90° C. for 1 minute so that two adhesive layer-carrying transparent protective films were obtained. The two adhesive layer-carrying transparent protective films were laminated to both sides of the polarizer by means of a roller to form a polarizing plate.

Examples 2 to 4 and Comparative Examples 1 to 5

Adhesives were prepared using the process of Example 1, except that the type of each component and the content of each component used were changed as shown in Table 1. Polarizing plates were also prepared using the resulting adhesives in the same manner as Example 1.

Example 5

A polarizing plate was prepared in the same manner as in Example 1, except that a 40 μm-thick poly(methyl methacrylate) resin (Acrypet VH manufactured by Mitsubishi Rayon Co., Ltd.) was used as the second transparent protective film in place of the 70 μm-thick biaxially-stretched norbornene film.

(Evaluation)

The polarizing plates obtained in Examples and Comparative Examples were evaluated as described below.

(Unevenness in Polarizing Plates)

Whether or not unevenness was observed in the polarizing plate in its original state obtained in each example was checked and evaluated according to the following criteria.

⊙: No unevenness was observed in the resulting polarizing plate even in a dark room, and no defective image display occurred.

○: Unevenness was observed in the resulting polarizing plate in a dark room, but no defective image display occurred.

×: Unevenness was observed in the resulting polarizing plate, and image display was affected.

A surface profilometer (WYKO NT3300 available from Matsushita Electric Industrial Co., Ltd.) was used to measure unevenness in the polarizing plate. A case where a ring-like profile as shown in FIG. 1 was visually observed may be evaluated as "×"

(Adhesion in Hot Water)

The polarizing plate was cut into sample pieces each 50 mm long in the absorption axis direction of the polarizer and 25 mm long in the direction perpendicular to the absorption axis. The sample piece was immersed in hot water at 60° C., and time until separation or peeling occurred at the edge of the sample piece was measured.

(Optical Properties, Amount of Change in Transmittance)

A sample 50 mm×25 mm in size was obtained by cutting a widthwise center portion of the resulting polarizing plate in such a manner that the long side of the sample made an angle of 45° with the absorption axis of the polarizing plate. The single-piece transmittance (%) of the sample was measured with an integrating sphere type spectral transmittance meter (DOT-3C, manufactured by Murakami Color Research Laboratory). The amount of change in single-piece transmittance was determined as described below. All the polarizing plates had a single-piece transmittance (T1) of 42.5% immediately after the preparation. The single-piece transmittance (T2) of each polarizing plate was then measured 500 hours after the preparation. T2/T1 was calculated as the amount of change in single-piece transmittance. In Table 1, "⊙" represents cases where the amount of change was ±3%, "○" cases where the amount of change was ±5%, and "×" cases where the amount of change was ±10%.

TABLE 1

| | Protective Films for Polarizing Plate | | Leveling Agent | | Evaluation | | |
|---|---|---|---|---|---|---|---|
| | First Protective Film | Second Protective Film | Type | Content (parts) | Unevenness in Polarizing Plate | Adhesion in Hot Water (hours) | Amount of Change in Transmittance (%) |
| Example 1 | Triacetylcellulose Type | Norbornene Type | Acetylenic Type | 0.15 | ○ | 24 Hours or more | ⊙ |
| Example 2 | Triacetylcellulose Type | Norbornene Type | Acetylenic Type | 0.5 | ⊙ | 24 Hours or more | ⊙ |
| Example 3 | Triacetylcellulose Type | Norbornene Type | Acetylenic Type | 3 | ⊙ | 24 Hours or more | ○ |
| Example 4 | Triacetylcellulose Type | Norbornene Type | Acetylenic Type | 7 | ⊙ | 7 Hours | ○ |
| Example 5 | Triacetylcellulose Type | Acrylic Type | Acetylenic Type | 0.5 | ○ | 24 Hours or more | ⊙ |
| Comparative Example 1 | Triacetylcellulose Type | Norbornene Type | Acetylenic Type | 0 | x | 7 Hours or more | ⊙ |
| Comparative Example 2 | Triacetylcellulose Type | Norbornene Type | Acetylenic Type | 0.05 | x | 7 Hours or more | ⊙ |
| Comparative Example 3 | Triacetylcellulose Type | Norbornene Type | Acetylenic Type | 12 | ⊙ | 2 Hours | x |
| Comparative Example 4 | Triacetylcellulose Type | Norbornene Type | Fluoro Type | 0.5 | ○ | 5 Hours | x |
| Comparative Example 5 | Triacetylcellulose Type | Norbornene Type | Silicone Type | 0.5 | x | 24 Hours or more | x |

Concerning the leveling agents in Table 1, Acetylenic Type represents a leveling agent containing an acetylene skeleton-containing compound (Olfine EXP4123 (trade name) manufactured by Nissin Chemical Industry Co., Ltd., 40% in solid content, containing a mixture of water/propylene glycol=10/50 in weight ratio as a dispersion medium), Fluoro Type represents a leveling agent containing perfluoroalkyl ethylene oxide adducts (Megaface F-443 manufactured by DIC Corporation, 100% in solid content), and Silicone Type represents BYK-345 (trade name) manufactured by BYK Japan KK.

Table 1 show that no unevenness was observed in the polarizing plates obtained in the examples, although they were produced by a precoating method. From Table 1, it is apparent that each of the adhesives used in the examples was smoothly applied to each transparent protective film and had good wettability to each transparent protective film. It is also apparent that the polarizing plates obtained in the examples exhibited a high level of water-resistant adhesion at high temperature and had satisfactory optical properties.

What is claimed is:

1. A polarizing plate, comprising:
a polarizer; and
a transparent protective film provided on at least one side of the polarizer with an adhesive layer interposed therebetween, wherein
the adhesive layer is formed of an adhesive, wherein the adhesive comprises a resin solution comprising a polyvinyl alcohol-based resin, a crosslinking agent and a leveling agent containing an acetylene skelton-containing compound, wherein 0.01 to 10 parts by weight of the leveling agent is added to 100 parts by weight of the polyvinyl alcohol-based resin.

2. The polarizing plate according to claim 1, wherein the adhesive layer has a thickness of 10 nm to 300 nm.

3. The polarizing plate according to claim 1, wherein the leveling agent is an aqueous dispersion or aqueous solution containing the acetylene skeleton-containing compound.

4. The polarizing plate according to claim 3, wherein the aqueous dispersion contains alkylene glycol.

5. The polarizing plate according to claim 1, wherein the acetylene skeleton-containing compound is an ethylene oxide and/or a propylene oxide adduct of acetylene glycol.

6. The polarizing plate according to claim 1, wherein the polyvinyl alcohol-based resin is a polyvinyl alcohol-based resin having an acetoacetyl group.

7. The polarizing plate according to claim 1, wherein the crosslinking agent contains a methylol group-containing compound.

8. The polarizing plate according to claim 1, wherein an amount of the crosslinking agent is of 1 to 60 parts by weight based on 100 parts by weight of the polyvinyl alcohol-based resin.

9. An optical film, comprising a laminate including at least one piece of the polarizing plate according to claim 1.

10. An image display, comprising the polarizing plate according to claim 1.

11. An image display, comprising the optical film according to claim 9.

12. A method for manufacturing the polarizing plate of claim 1, comprising the steps of:
applying the adhesive to the transparent protective film to form the adhesive layer; and
laminating the polarizer to the adhesive layer-carrying transparent protective film through the adhesive layer.

13. A method for manufacturing the polarizing plate of claim 1, comprising the steps of:
applying the adhesive to the transparent protective film and then drying the adhesive to form the adhesive layer on the transparent protective film; and
laminating the polarizer to the adhesive layer-carrying transparent protective film through the adhesive layer.

14. The method for manufacturing a polarizing plate according to claim 12, wherein the leveling agent is an aqueous dispersion or aqueous solution containing the acetylene skeleton-containing compound.

15. The method for manufacturing a polarizing plate according to claim 14, wherein the aqueous dispersion contains alkylene glycol.

16. The method for manufacturing a polarizing plate according to claim 12, wherein the acetylene skeleton-containing compound is an ethylene oxide and/or a propylene oxide adduct of acetylene glycol.

17. The method for manufacturing a polarizing plate according to claim 12, wherein the polyvinyl alcohol-based resin is a polyvinyl alcohol-based resin having an acetoacetyl group.

18. The method for manufacturing a polarizing plate according to claim 12, wherein the crosslinking agent contains a methylol group-containing compound.

19. The method for manufacturing a polarizing plate according to claim 12, wherein an amount of the crosslinking agent is of 1 to 60 parts by weight based on 100 parts by weight of the polyvinyl alcohol-based resin.

20. The method for manufacturing a polarizing plate according to claim 13, wherein the leveling agent is an aqueous dispersion or aqueous solution containing the acetylene skeleton-containing compound.

21. The method for manufacturing a polarizing plate according to claim 20, wherein the aqueous dispersion contains alkylene glycol.

22. The method for manufacturing a polarizing plate according to claim 13, wherein the acetylene skeleton-containing compound is an ethylene oxide and/or a propylene oxide adduct of acetylene glycol.

23. The method for manufacturing a polarizing plate according to claim 13, wherein the polyvinyl alcohol-based resin is a polyvinyl alcohol-based resin having an acetoacetyl group.

24. The method for manufacturing a polarizing plate according to claim 13, wherein the crosslinking agent contains a methylol group-containing compound.

25. The method for manufacturing a polarizing plate according to claim 13, wherein an amount of the crosslinking agent is of 1 to 60 parts by weight based on 100 parts by weight of the polyvinyl alcohol-based resin.

* * * * *